United States Patent
Winstead et al.

(10) Patent No.: US 7,082,934 B2
(45) Date of Patent: Aug. 1, 2006

(54) CONTROLLING SPARK FOR AN ENGINE WITH CONTROLLABLE VALVES

(75) Inventors: Vince Winstead, Farmington Hills, MI (US); John R. Grabowski, Dearborn, MI (US); Ilya Kolmanovsky, Farmington Hills, MI (US); Michael W. Degner, Novi, MI (US); Alex O. Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/924,471

(22) Filed: Aug. 24, 2004

(65) Prior Publication Data
US 2006/0042609 A1    Mar. 2, 2006

(51) Int. Cl.
*F02P 9/00* (2006.01)
*F01L 9/04* (2006.01)
(52) U.S. Cl. ............... 123/625; 123/90.11; 123/90.15
(58) Field of Classification Search ............ 123/90.11, 123/90.15–90.17, 612, 621, 625, 630, 644, 123/651, 652
See application file for complete search history.

(56) References Cited

U.S. PATENT DOCUMENTS

| | | | | |
|---|---|---|---|---|
| 4,233,949 A | * | 11/1980 | Poirier d'Ange d'Orsay | 123/634 |
| 5,606,278 A | * | 2/1997 | Palara | 327/321 |
| 5,765,514 A | * | 6/1998 | Sono et al. | 123/90.11 |
| 5,864,471 A | * | 1/1999 | Kammiller et al. | 363/17 |
| 6,158,403 A | | 12/2000 | Berecewicz et al. | |
| 6,178,934 B1 | * | 1/2001 | Hirasawa et al. | 123/90.11 |
| 6,216,678 B1 | | 4/2001 | James et al. | |
| 6,390,038 B1 | * | 5/2002 | Di Lieto et al. | 123/90.11 |
| 6,401,684 B1 | | 6/2002 | Hori et al. | |
| 6,435,147 B1 | | 8/2002 | Eichenseher et al. | |
| 6,457,353 B1 | * | 10/2002 | Kanke et al. | 73/117.3 |
| 6,491,022 B1 | * | 12/2002 | Okamoto | 123/90.15 |
| 6,545,372 B1 | * | 4/2003 | Hanyu et al. | 123/90.11 |
| 6,545,478 B1 | * | 4/2003 | Torres | 123/644 |
| 6,574,545 B1 | | 6/2003 | Hartke et al. | |

* cited by examiner

*Primary Examiner*—T. M. Argenbright
(74) *Attorney, Agent, or Firm*—Donald J. Lewis; Allan J. Lippa (57) ABSTRACT

A system and method to control spark in a cylinder of a multi-cylinder engine. Spark can be controlled in a cylinder based on operating conditions of a selectively operable valve.

27 Claims, 8 Drawing Sheets

CONTROLLING SPARK FOR AN ENGINE WITH CONTROLLABLE VALVES

FIELD

The present description relates to a method for controlling ignition spark in an engine having controllable valves and more particularly to a method for controlling spark during an indication of a degraded valve.

BACKGROUND

Selectively operable valves may be used in some circumstances to improve fuel economy, emissions, and performance of a piston driven internal combustion engine. Operation of individual valves may be based on a single or a combination of engine operating conditions so that the number of operating valves can be adjusted to meet demand and control objectives. Several different methods may be used to selectively operate or inhibit operation of valves including: mechanically inhibited cam actuated valves, electrically actuated valves, and electrohydraulic actuated valves. If valve degradation of selectively operated valves can be determined, it may be beneficial to control ignition spark during a combustion cycle of a cylinder based on the degradation.

One method to control engine ignition spark is described in U.S. Pat. No. 6,401,684. During an abnormal valve operating condition, at the transition from an open intake valve condition to a closed intake valve condition, this method attempts to delay ignition spark by increasing the duration of current flowing into the ignition coil until the second half of the power stroke in the respective cylinder. In addition, the method may attempt to inhibit ignition spark, if the ignition coil has not started to charge, when an abnormal valve condition is generated at the transition from a closed intake valve condition to an open intake valve condition. Furthermore, the method may also attempt to inhibit spark if an abnormal condition is generated at a transition from an open exhaust valve condition to a closed exhaust valve condition.

The inventors herein have recognized that the beforementioned approach can have several disadvantages. For example, extending coil charging into the second half of the power stroke may produce more than a desirable amount of coil current which could degrade the ignition coil. Further, the method attempts to extend a spark event to a point that is late in the cylinder cycle. As a result, combustion may still occur since both spark and fuel can be present in the cylinder. If an intake valve remains open during combustion, the intake manifold temperature and pressure may increase more than desired. On the other hand, if an exhaust valve remains open during combustion, the exhaust valve temperature may increase more than desired. As such, following the approach taught in the prior art may lead to several issues.

SUMMARY

One embodiment of the present description includes a method of interrupting at least a spark event to at least a cylinder of a multi-cylinder internal combustion engine having at least a valve that may be held in a position during a cycle of said at least a cylinder, the method comprising: limiting the voltage of an ignition coil delivering energy to at least a spark plug in said at least a cylinder when said at least a valve has at least partially degraded.

By limiting the voltage of an ignition coil that delivers energy to a spark plug located in the cylinder when at least a valve is partially degraded, ignition coil degradation can be reduced. Furthermore, intake manifold temperature, intake manifold pressure, and exhaust valve temperature may be reduced when ignition coil voltage is limited during a condition of valve degradation.

In particular, valves that may be selectively activated during a cycle of a cylinder, may experience degraded operation under certain conditions. This can include valves that may be operated without regard to crankshaft position, (e.g., electrically actuated valves, including electrohydraulic and electromechanical valves). If degraded valve operation is determined, it may be beneficial to control combustion in the affected cylinder. For example, if an intake and/or exhaust valve does not follow a desired trajectory, spark can be controlled, in the affected cylinder, so that the uncombusted air-fuel mixture may not be ignited by a spark from the spark plug. This may be achieved by limiting the voltage of the ignition coil so that the voltage potential across the spark plug is below the level that causes a spark. By limiting the ignition coil voltage, spark in a cylinder may be controlled without producing elevated ignition coil current or delayed combustion. In addition, via spark control, combustion can be regulated in a cylinder to reduce the temperatures and pressures that intake and/or exhaust manifolds and valves may experience.

In another aspect of the present description, the present description provides for a system for interrupting a least a spark event to at least a cylinder of a multi-cylinder internal combustion engine having at least a valve that may be held in a position during a cycle of said at least a cylinder, the system comprising: an ignition coil comprising a core, a primary winding, a secondary winding, and an auxiliary winding; and a switching device to allow current flow in said auxiliary winding.

In other words, spark delivery to a cylinder may also be inhibited by controlling the flow of current in an ignition coil. Active coil current control, (i.e., regulating the current flow in one or more coils of an ignition coil), or passive coil current control, (i.e., shunting an auxiliary coil, for example), may be used to control the current flow in the ignition coil secondary winding. This can reduce the induced secondary coil voltage, thereby decreasing the probability of creating a spark in the cylinder.

The present description can provide several advantages. For example, during a condition of valve degradation, spark may be controlled before or after an ignition coil has begun to charge. This may allow a single and simple spark control strategy to regulate combustion in a cylinder. In addition, engine emissions may be reduced during conditions of valve degradation since combustion in a cylinder experiencing valve degradation may be regulated. For example, reducing the amount of exhaust gas that may be pumped from a cylinder having valve degradation into the intake manifold may reduce the probability of misfire in other engine cylinders, thereby lowering engine emissions.

Note also that various other approaches may be taken in determining and responding to valve degradation.

The above advantages and other advantages, and features of the present description will be readily apparent from the following detailed description of the preferred embodiments when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
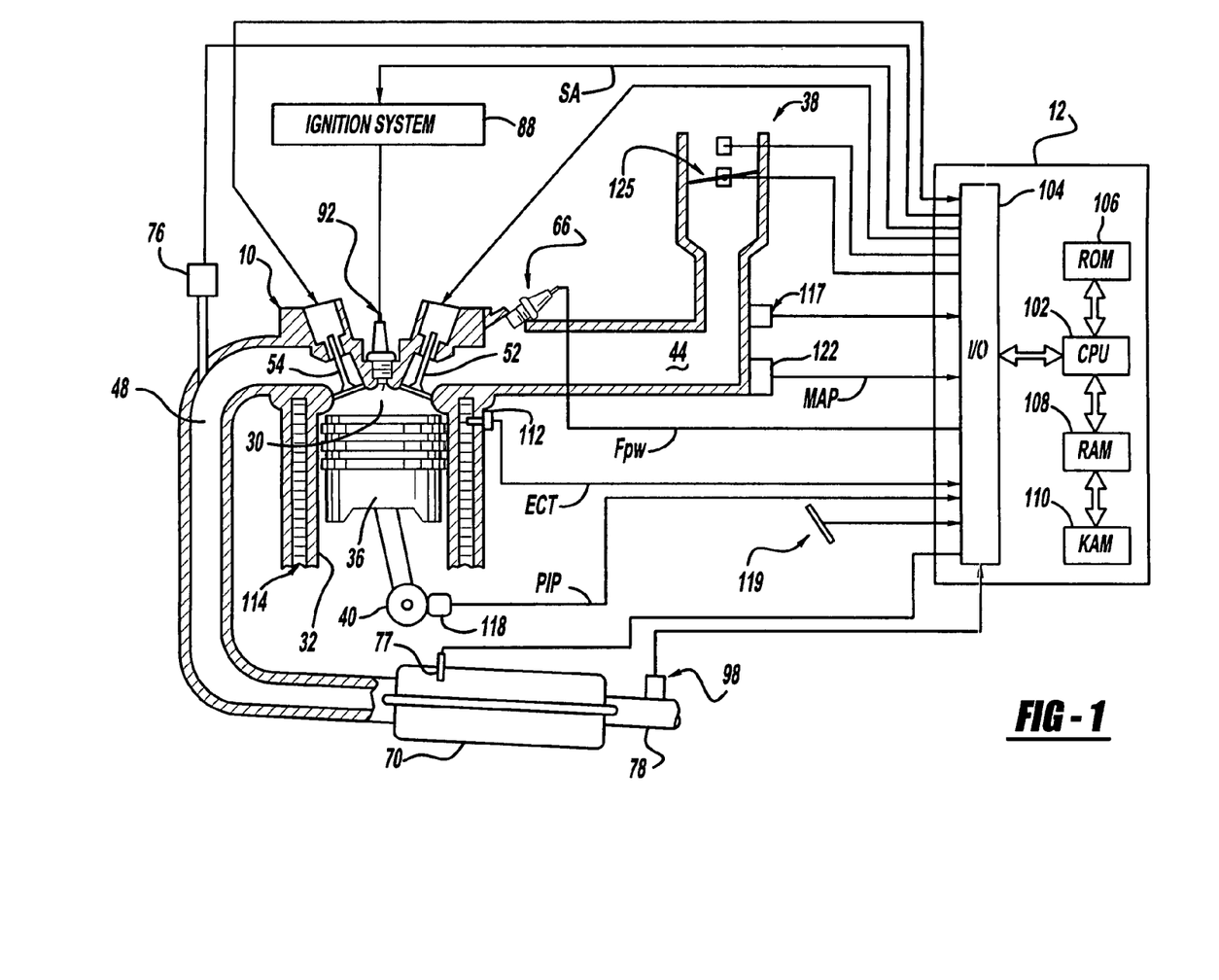
FIG. 1 is a schematic diagram of an engine having selectively operable intake and exhaust valves.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52, and exhaust valve 54. Intake and/or exhaust valves may be electrically actuated, (e.g., electromechanical or electrohydraulic), or they may be mechanically driven via a camshaft and having a known means for selectively activating and/or deactivating the valves. Furthermore, combinations and sub-combinations of mechanical, electromechanical, mechanically deactivated, and electrically actuated intake and exhaust valvetrains may be configured, but are not shown. Note: a deactivated valve may be in an open or closed state while deactivated.

Intake manifold 44 is shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection (where the injector is coupled to the combustion chamber 30). Intake manifold 44 is shown communicating with electronic throttle 125, throttle position is based, in part, on a signal from accelerator pedal 119. Alternatively, a mechanical throttle and pedal can be substituted for electronic throttle 125. Air mass sensor 38 is located upstream of electronic throttle 125 and provides a signal representative of inducted air mass to controller 12.

Distributorless ignition system 88 provides ignition spark to combustion chamber 30 via spark plug 92 in response to controller 12. Two-state exhaust gas oxygen sensor 76 is shown coupled to exhaust manifold 48 upstream of catalytic converter 70. Alternatively, a Universal Exhaust Gas Oxygen (UEGO) sensor may be substituted for two-state sensor 76. Two-state exhaust gas oxygen sensor 98 is shown coupled to exhaust pipe 78 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Controller 12 is shown in FIG. 1 as a conventional microcomputer including: microprocessor unit 102, input/output ports 104, and read-only memory 106, random-access memory 108, keep-alive memory 110, and a conventional data bus. Controller 12 is shown receiving various signals from sensors coupled to engine 10, in addition to those signals previously discussed, including: engine coolant temperature (ECT) from temperature sensor 112 coupled to cooling jacket 114; a measurement of manifold absolute pressure (MAP) from pressure sensor 122 coupled to intake manifold 44; a measurement of driver demand from pedal position sensor 119; a measurement (ACT) of engine air amount temperature or manifold temperature from temperature sensor 117; and a profile ignition pickup signal (PIP) from a Hall effect sensor 118 coupled to a crankshaft 40.

Figure 2:
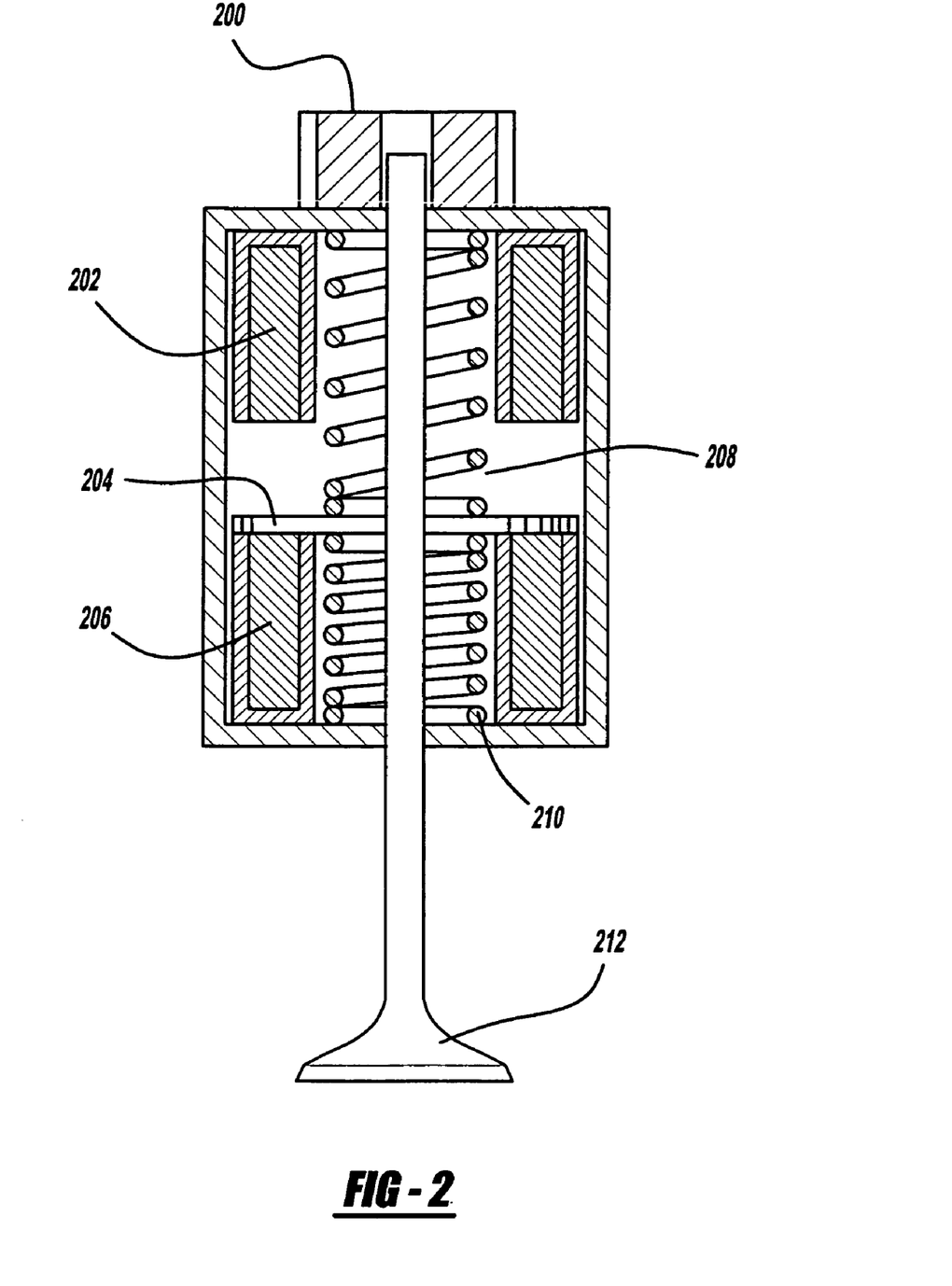
FIG. 2 is a schematic diagram that shows details of an example electrically actuated valve.

Referring to FIG. 2, a schematic diagram that shows an example electrically actuated valve that is being held in an open position, such as an electromechanical valve. Valve position is measured using linear variable displacement transducer 200. The position of valve 212 alters the magnetic flux in the sensor to provide a linear output that is indicative of valve position. Alternatively, other types of analog sensors may be used or discrete sensors can be used to detect valve position.

Valve position is determined by valve springs 208 and 210 along with the state of coils 202 and 206. When the coils are not energized, valve 212 is held in a mid position by opposing forces that are applied to armature 204 from springs 208 and 210.

The figure shows coil 206 in an energized state; a magnetic field produced by energizing the coil draws the armature 204 to the coil. The valve can be closed by de-energizing coil 206 and energizing coil 202. During the transition from open to closed, spring 210 helps to drive and accelerate armature 204 from coil 206 to coil 202. Conversely, spring 208 helps to drive the armature to coil 206 when the valve is opened.

Figure 3:
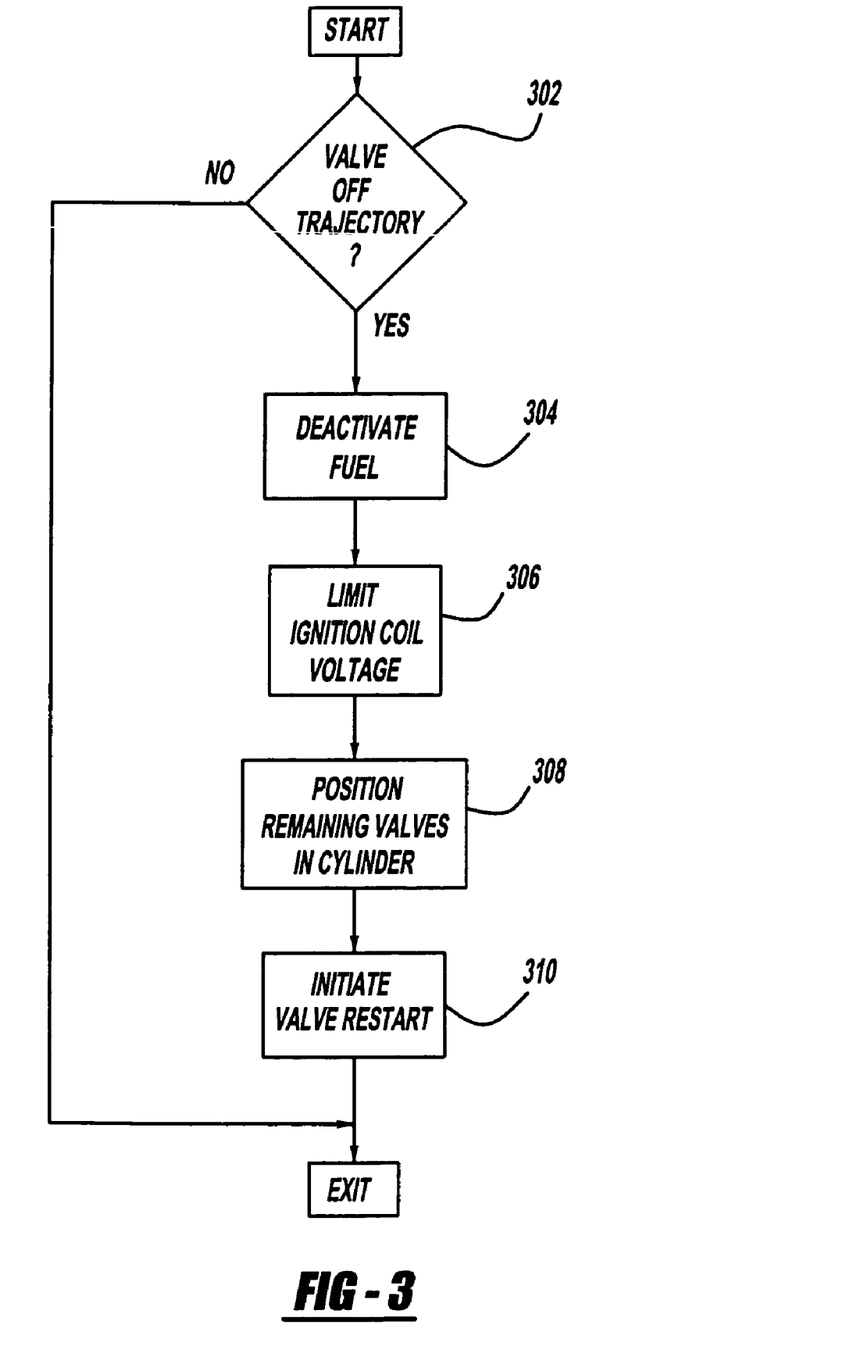
FIG. 3 is a flow diagram that shows an ignition coil voltage limiting strategy.

Referring to FIG. 3, an example flow diagram of an ignition voltage limiting strategy is shown. In step 302, the strategy determines if there is an error in a valve trajectory. In one example, the current valve position is compared to a predetermined map that relates valve position to a crankshaft position. If a valve is off trajectory by a threshold amount, the routine continues to step 304, if not, the routine exits. Each valve that may be held in a position during a cycle of a cylinder, (e.g., open or closed), may be evaluated to determine if ignition voltage should be limited in a cylinder based on the off-trajectory valve. The threshold amount may be adjusted depending on operating conditions, since more error may be expected under some conditions compared to others, such as, for example: during cold or warm operating temperatures.

Alternatively, a valve trajectory error may be inferred from other engine sensors and/or calculations, pressure sensors, flow sensors, temperature sensors, engine position sensors, calculated engine acceleration, and oxygen sensors, and/or combinations thereof, for example. If valve degradation has occurred, the sensor may provide a signal that can be compared to a nominal reference signal to determine valve degradation. For example, an engine operating at a given speed and load may usually operate at an air-fuel ratio that is near a stoichiometric value. If valve degradation has occurred, an oxygen sensor in the exhaust system may observe an exhaust mixture that deviates from stoichiometric combustion. Therefore, a determination of valve degradation may be determined from an oxygen sensor, based on a deviation from stoichiometry.

In step 304, fuel injection is deactivated to stop fuel flow to the cylinder having an off-trajectory valve. Fuel may be deactivated before or during an injection event depending on when valve degradation is determined. For example, if a fuel injection interval is scheduled to overlap the transition from a closed intake valve to an open intake valve, and an intake valve trajectory error is determined, fuel flow may be stopped subsequent to the determination of the trajectory error but prior to the end of the scheduled injection interval. On the other hand, if an exhaust valve trajectory error is determined before fuel injection begins, fuel injection may be stopped without beginning the injection event. The routine proceeds to step 306.

In step 306, ignition coil voltage is limited. Ignition coil voltage can be generated by any one of several known methods that transform electrical system voltage into a higher voltage that is capable of creating a spark across a spark plug gap. Typical ignition coil circuit configurations include B+ common, common ground, and variants.

The B+ common configuration supplies one side of the primary coil and one side of the secondary coil with vehicle electrical system voltage, B+ for example. The primary coil can be charged when current is allowed to flow between B+ and ground. The opposite side of the secondary coil is electrically connected to a spark plug, 92 of FIG. 1 for example. A spark can be generated at the spark plug by interrupting current flow to the primary coil when sufficient energy has been stored in the ignition coil core.

The common ground configuration supplies the primary coil with B+ and does not supply B+ voltage to the secondary coil. One side of the secondary coil is electrically connected to the spark plug while the opposite end of the coil is electrically connected to ground. A spark can be generated at the spark plug by interrupting current flow to the primary coil after sufficient energy has been stored in the ignition coil core.

The above mentioned ignition configurations and known variants can be designed to reduce the probability of spark during valve degradation by the circuits shown in FIGS. 5–10 and variants thereof. As such, the illustrations are not meant to limit the breadth or scope of the disclosure.

Continuing with step 306, a circuit that can limit ignition coil voltage is electrically coupled to the ignition coil. The coupling may include electrical coupling, physical coupling, magnetic coupling, or other coupling that links the circuits. Ignition coil voltage may be limited in the primary or secondary coil, but because of higher secondary voltages, limiting the primary voltage may be more advantageous in some cases. Ignition voltage can be limited in the affected cylinder until valves are on a desired trajectory. The routine then proceeds to step 308.

In step 308, on-trajectory valves are set to a predetermined position. If either an intake or an exhaust has been determined to be off-trajectory, the remaining selectively controllable valves in the cylinder may be set to a closed position until the off-trajectory valve resumes a desired trajectory. If fuel injection has occurred and an air-fuel mixture has been inducted into the cylinder, closing on-trajectory valves may reduce the amount of uncombusted fuel that is expelled into the exhaust system. Alternatively, on-trajectory intake valves may be set to an open position for at least one piston stroke that is in the direction of the cylinder head. This may reduce the amount of uncombusted hydrocarbons that may be pumped into the exhaust system. Furthermore, open intake valves may allow the air-fuel mixture to be pumped into the intake manifold where it can be subsequently combusted in another cylinder, thereby reducing the chance of combusting in cylinders with off-trajectory valves. The routine continues to step 310.

In step 310, an attempt is made to restart the off-trajectory valve. As described above, electrically actuated valves, and electromechanical valves in particular, may assume a center or mid position if they are off-trajectory. This type of valve may be restarted to resume a desired trajectory by directly pulling the valve armature toward an opening or closing coil, or by oscillating the valve between the opening coil and the closing coil until the valve can be captured in an open or closed position. On the other hand, cam driven mechanically operated valves may be reactivated by making attempts to engage or disengage mechanical operating mechanisms. If attempts to restart off-trajectory valve are unsuccessful the cylinder may be deactivated by inhibiting fuel and ignition coil current. Alternatively, step 310 may be an external routine that is executed at a rate different than the routine of FIG. 3. The routine proceeds to exit.

Figure 4:
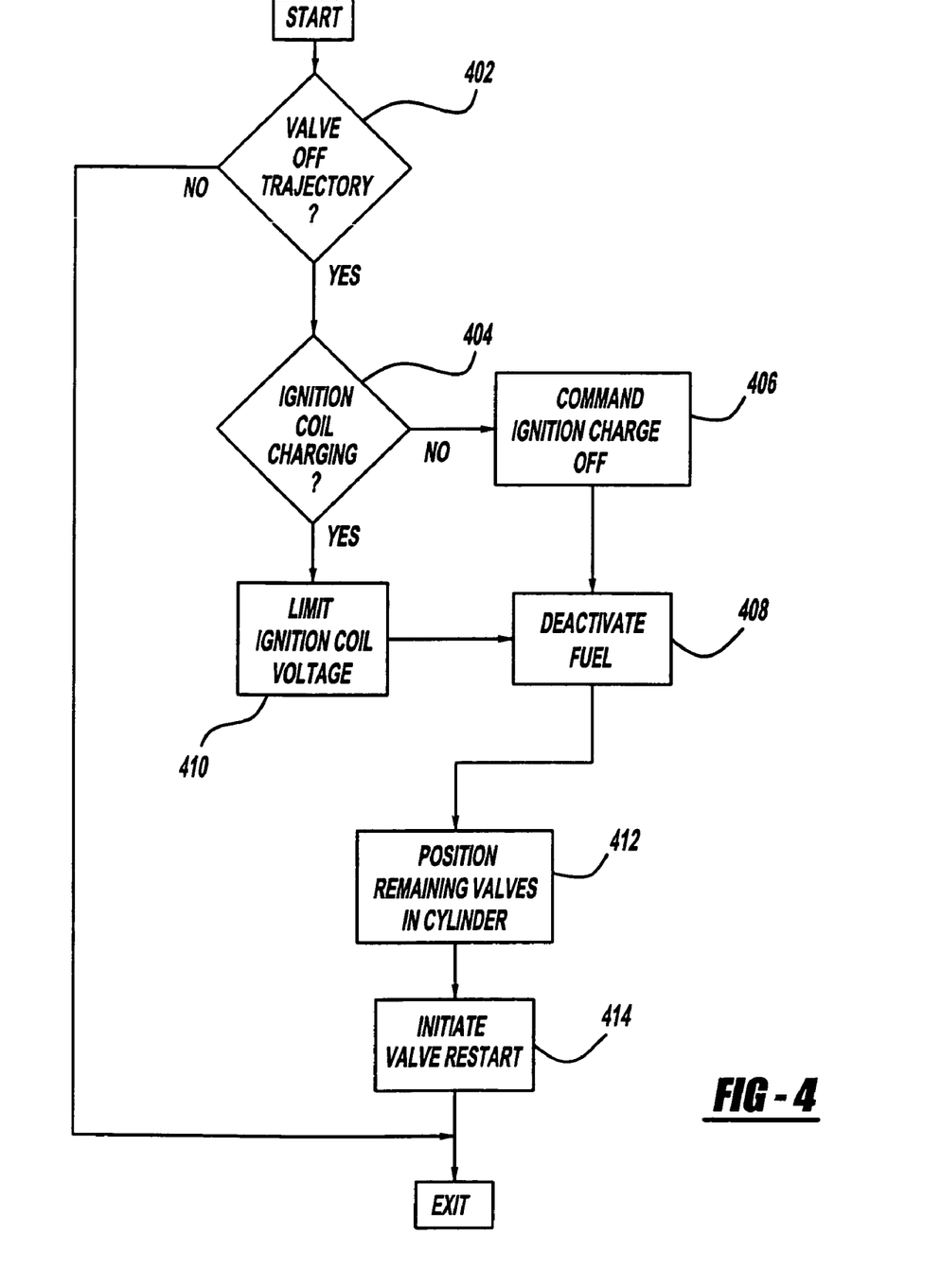
FIG. 4 is a flow diagram that shows an alternate ignition coil voltage limiting strategy.

Referring to FIG. 4, an example flow diagram of an alternate ignition coil voltage limiting strategy is shown. In step 402, the strategy determines if there is an error in a valve trajectory. The method of FIG. 3, step 302, described above, may be used to determine if a valve is off-trajectory. The routine continues to step 404.

In step 404, the routine determines if the ignition coil has begun to charge. If current has started to flow into the coil, the routine proceeds to step 410, if not, the routine continues to step 406.

In step 410, ignition coil voltage is limited. The method of FIG. 3, step 306, described above, may be used to limit ignition coil voltage in step 410. After limiting coil voltage the routine proceeds to step 408.

In step 406, ignition coil charging is commanded off. During low speed engine operation or while valve timing is advanced, intake and/or exhaust valve degradation may be determined for a cylinder before a coil begins to charge. Typical spark dwell (coil charging) times can range between 1–4 milliseconds, at low engine speeds intake valve opening and exhaust valve closing may occur well before an ignition coil begins to charge. If there is sufficient time between an indication of valve degradation and starting the flow of ignition coil current, it may be possible to stop ignition coil current before coil charging starts by commanding the coil current driving circuit off. The routine proceeds to step 408.

In step 408, fuel injection is deactivated in the cylinder that has valve degradation. As described above, for the description of step 304, fuel may be deactivated before or during an injection event depending on when valve degradation is determined and when fuel injection is scheduled. The routine proceeds to step 412.

In step 412, valves that are on-trajectory are set to predetermined positions. The method described for step 308 of FIG. 3 may be used to position on-trajectory valves if one or more valves in a cylinder are off trajectory. The routine continues to step 310.

In step 414, an attempt to restart the off-trajectory valve is made. That is, an attempt is made to bring the off-trajectory valve back on trajectory. Specifically, the method described for step 310 of FIG. 3 may be used in an attempt to restart the off-trajectory valve. If the attempt to restart the valve is unsuccessful, the cylinder may be deactivated by stopping fuel flow, air flow, and spark to the cylinder. The routine proceeds to exit.

Figure 5:
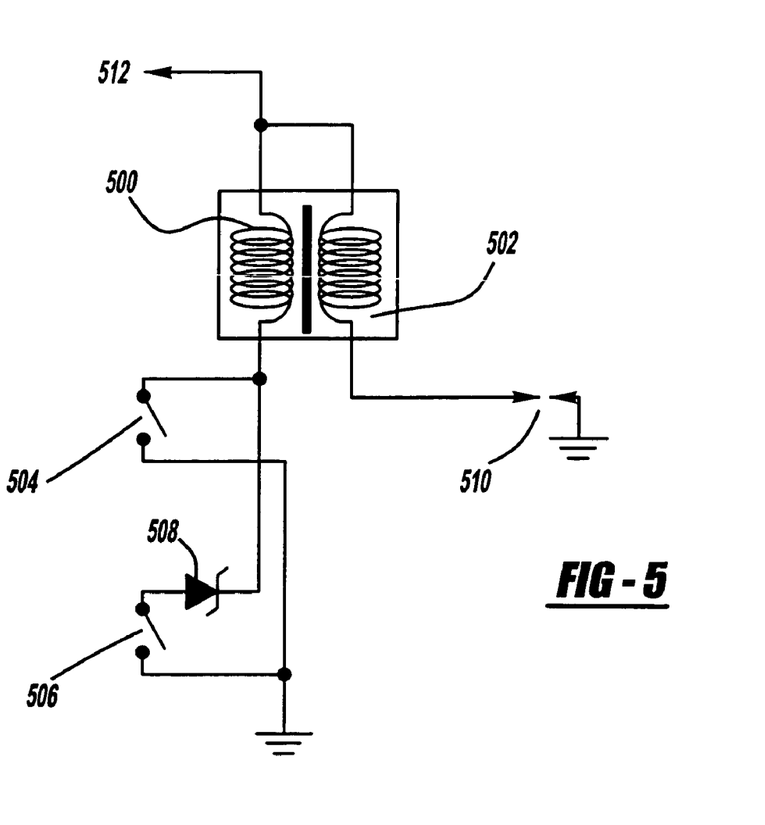
FIG. 5 is an example diagram that shows a low side primary ignition coil voltage limiting circuit.

Referring to FIG. 5, a schematic of an example ignition coil voltage limiting circuit is shown. The ignition coil is comprised of a primary coil 500 and a secondary coil 502. Primary coil 500 can be charged by allowing current to flow from low voltage at lead 512 to the low voltage return (e.g., ground). Current flow through the primary coil 500 may be controlled via switch 504 which is connected between the low voltage side of primary coil 500 and low voltage return. Zener diode 508 is also connected to the low voltage side of primary coil 500 and may limit voltage in primary coil 500 when switch 506 electrically couples zener diode 508 between the low voltage side of primary coil 500 and the low voltage return.

The switches shown in FIG. 5–10 may be constructed in a variety of ways depending on the circuit configuration and control objectives. In one example, an insulated gate bipolar transistor (IGBT) may be used to control the circuitry. As such, the switch illustrations are not meant to limit the breadth or scope of the disclosure.

When valve degradation has not been determined, ignition spark can be controlled by an ignition controller that switches switch 504. When primary coil 500 charging is stopped (e.g., by removing current from the primary coil over a short time period by switch 504) the magnetic field in the core can no longer be supported by current in the primary coil. This can cause the magnetic field to rapidly reduce, thereby inducing a voltage in the secondary coil and a spark at the spark plug gap. The induced voltage in the secondary coil, created by this decreasing magnetic field, can be higher than the voltage in the primary coil if there are a greater number of turns in the secondary coil, relative to the primary coil.

If valve degradation has been determined, the low voltage side of the primary ignition coil can be electrically coupled to the low voltage return through an electrical network comprising zener diode 508 (other components may be substituted for the zener diode, a metal oxide varistor for example). Switch 506 can be controlled to electrically couple the network to primary coil 500 during an indication of valve degradation. When the electrical network is coupled to primary coil 500, zener diode 508 does not conduct in the in the forward direction because the low voltage return is at a lower potential than the low voltage side of primary coil 500. However, current can flow through zener diode 508 in the reverse direction if the diode breakdown voltage is exceeded. The breakdown voltage can be exceeded if there is energy stored in ignition coil core, and if current flow into primary coil 500 is quickly stopped. Therefore, if an ignition controller is switching switch 504, and if zener diode 508 and switch 506 are coupled to primary coil 500, the zener diode can limit the voltage at the low voltage side of primary coil 500 by allowing current to flow to the low voltage return. In this way, the energy stored in primary coil 500 can be extracted at a controlled rate so that the induced voltage of secondary coil 502 remains low enough to reduce the possibility of a spark at spark plug gap 510, thereby interrupting a spark event.

When the low voltage side of the primary coil is decoupled from the low voltage return, zener diode 508 does not conduct so that the primary voltage may not be limited by the electrical network (switch 506 and zener diode 508).

Figure 6:
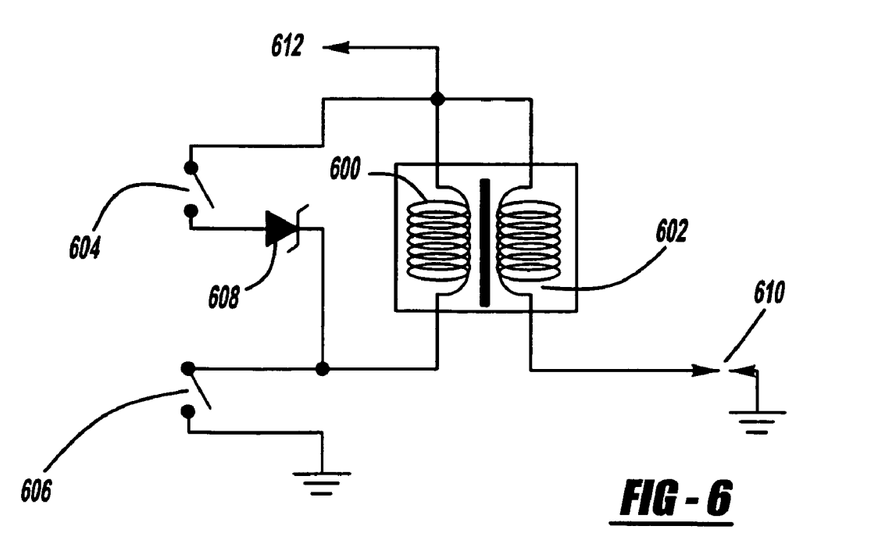
FIG. 6 is an example diagram that shows a shunt primary ignition coil voltage limiting circuit.

Referring to FIG. 6, a schematic of another example ignition coil voltage limiting circuit is shown. Again, an ignition coil is comprised of a primary coil 600 and a secondary coil 602. Primary coil 600 can be charged by allowing current to flow from low voltage at lead 612 to the low voltage return (e.g., ground). Current flow through the primary coil 600 may be controlled via switch 606 which is connected between the low voltage side of primary coil 600 and low voltage return. Zener diode 608 is also connected to the low side of primary coil 600 and may limit voltage in primary coil 600 when switch 604 electrically couples zener diode 608 between the low voltage side of primary coil 600 and the low voltage supply 612.

When valve degradation has not been determined, ignition spark can be controlled by an ignition controller that switches switch 606. The ignition coil can be used to create ignition spark in a manner as is detailed in the description of FIG. 5.

If valve degradation has been determined, the low voltage input side of the primary ignition coil 600 can be electrically coupled to the low voltage return side of primary coil 600 through an electrical network comprising zener diode 608 (again, other components may be substituted for the zener diode, a metal oxide varistor for example). Switch 604 can be controlled to limit voltage in primary coil 600 by allowing zener diode 608 to conduct in the reverse direction (from the low voltage side of the primary coil to the high side of the primary coil) if the breakdown voltage is exceeded. Switch 604 should be controlled such that zener diode 608 is coupled to primary coil 600 just before current flow is stopped between primary coil 600 and the low voltage return. Coupling zener diode 608 to primary coil 600 just before current flow is stopped, can limit the forward current flow from low voltage source 612 through zener diode 608 to low voltage return.

Figure 7:
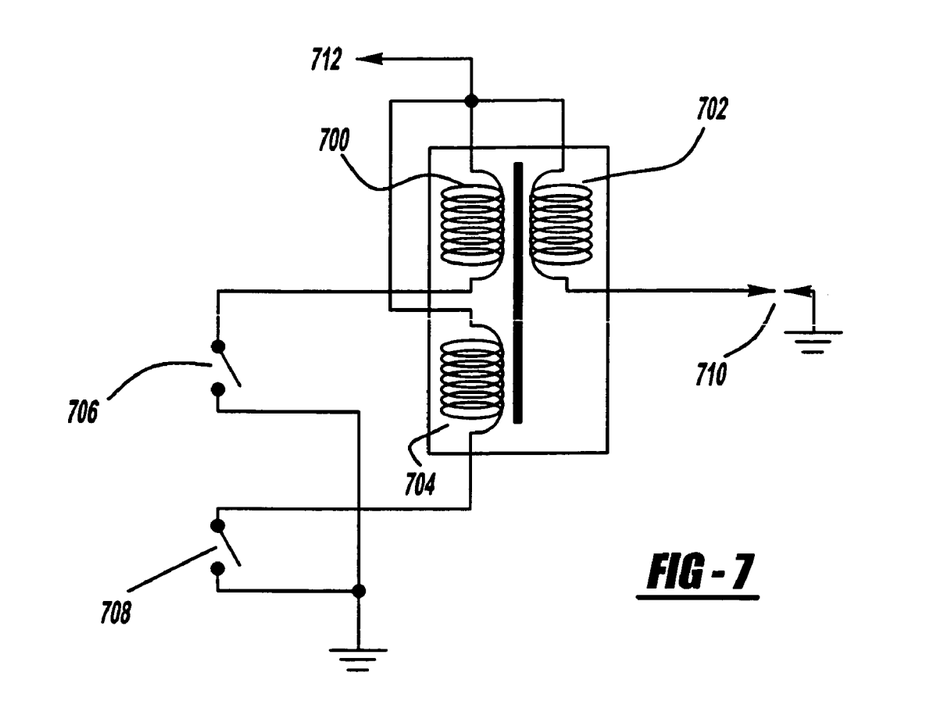
FIG. 7 is an example diagram that shows a auxiliary coil low side configuration for a magnetic flux based voltage limiting circuit.

Referring to FIG. 7, a schematic of an ignition coil comprising a primary coil 700, core, secondary coil 702, and an auxiliary coil 704 is shown. A low voltage is supplied to one side of the primary coil while the other side of the primary coil can be connected to the low voltage return through switch 706. Secondary coil 702 has one side connected to low voltage supply 712 while the opposite side of the coil is connected to a spark plug. One side of auxiliary coil 704 is connected to low voltage supply 712 while the opposite side of the coil can be connected to low voltage return, via switch 708. The auxiliary coil can be wound with polarity that is the reverse of the primary coil.

When valve degradation is not determined, primary coil 700 can store energy in the ignition coil core while switch 706 allows current to flow from low voltage supply 712 to the low voltage return. When the ignition coil core has stored sufficient energy, a spark can be generated at spark plug gap 710 by quickly stopping current from low voltage supply 712.

If valve degradation is determined, the secondary coil voltage can be limited by maintaining the magnetic flux by flowing current through auxiliary coil 704 and switch 708. The current in the auxiliary coil can then be decreased at a rate that reduces the possibility of creating a spark from the voltage induced at the secondary coil.

Figure 8:
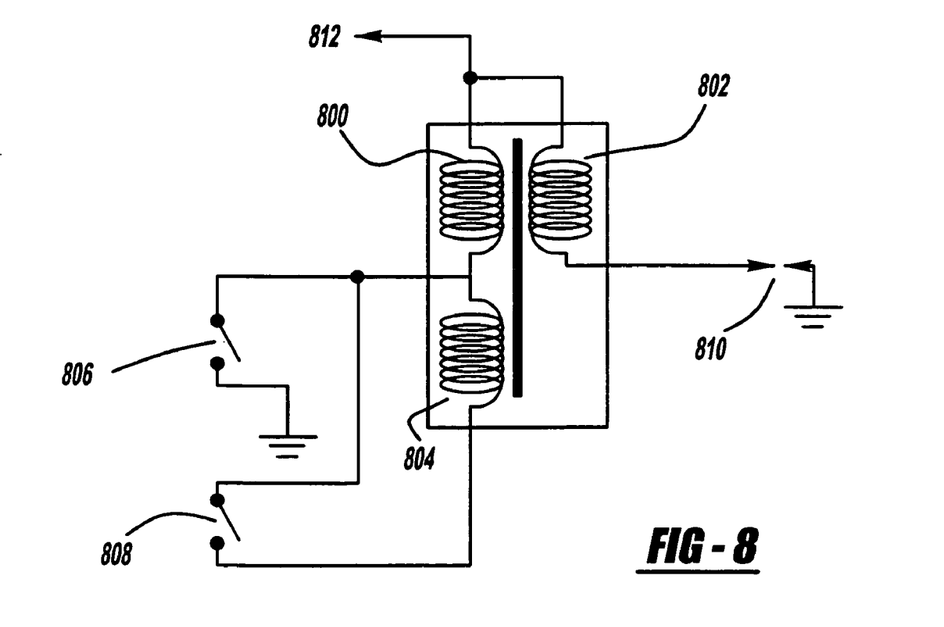
FIG. 8 is an example diagram that shows a auxiliary coil reduced wire count shunt configuration for a magnetic flux based voltage limiting circuit.

Referring to FIG. 8, a schematic of an alternate ignition coil having primary coil 800, core, secondary coil 802, and auxiliary coil 804 is shown. A low voltage supply 812 is connected to one side of the primary coil while the other side of the primary coil is connected to one side of the auxiliary coil. The primary coil can also be connected to the low voltage return through switch 806. Secondary coil 802 has one side connected to low voltage supply 812 while the opposite side of the coil is connected to a spark plug. One side of auxiliary coil 804 is connected to the low voltage side of the primary coil while the opposite side of the coil can be connected to the low voltage side of the primary coil, via switch 808.

When valve degradation is not determined, primary coil 800 can store energy in the core while switch 806 allows current to flow from low voltage supply 812 to the low voltage return. When the core has stored sufficient energy, a spark can be generated at spark plug gap 810 by quickly stopping current from low voltage supply 812.

If valve degradation is determined, switch 808 can shunt auxiliary coil 804. By shunting the coil, a low impedance path may be provided to dissipate the energy stored in the ignition coil core when current flow is interrupted to the primary coil. Consequently, current can be preferentially induced in the auxiliary coil over the secondary coil. This can reduce the possibility of creating a spark at the spark plug.

Figure 9:
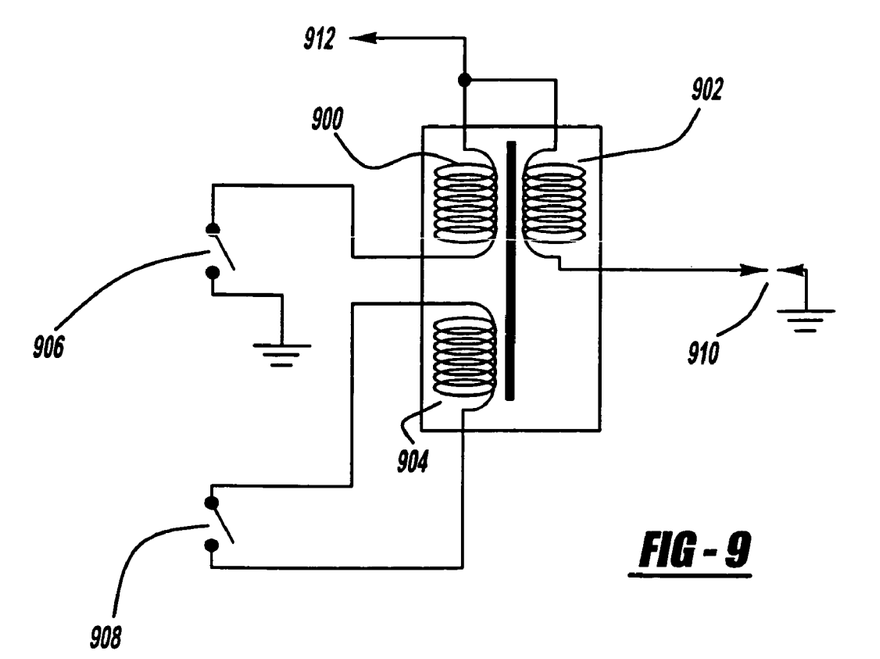
FIG. 9 is an example diagram that shows a auxiliary coil shunt configuration for a magnetic flux based voltage limiting circuit.

Referring to FIG. 9, a schematic of an alternate ignition coil having a primary coil 900, secondary coil 902, core, and an auxiliary coil 904 is shown. The one side of the primary coil is connected to low voltage supply 912 while the opposite side can be connected to low voltage return via switch 906. The secondary coil is connected to low voltage supply 912 and a spark plug. The auxiliary coil leads may be connected together (shunted) through switch 908. The auxiliary coil can be wound with polarity that is the reverse of the primary coil.

When valve degradation is not determined, primary coil 900 can store energy in the core while switch 906 allows current to flow from low voltage supply 912 to the low voltage return. When there is sufficient energy stored in the core, a spark can be generated at spark plug gap 910 by quickly stopping current flow from low voltage supply 912.

If valve degradation is determined, switch 808 can shunt auxiliary coil 904. By shunting the coil, a low impedance path may be provided to dissipate the energy stored in the ignition coil core when current flow is interrupted to the primary coil. Consequently, current can be preferentially induced in the auxiliary coil over the secondary coil. This can reduce the possibility of creating a spark at the spark plug. Operation of this circuit is essentially equivalent to that detailed in the description of FIG. 8.

Figure 10:
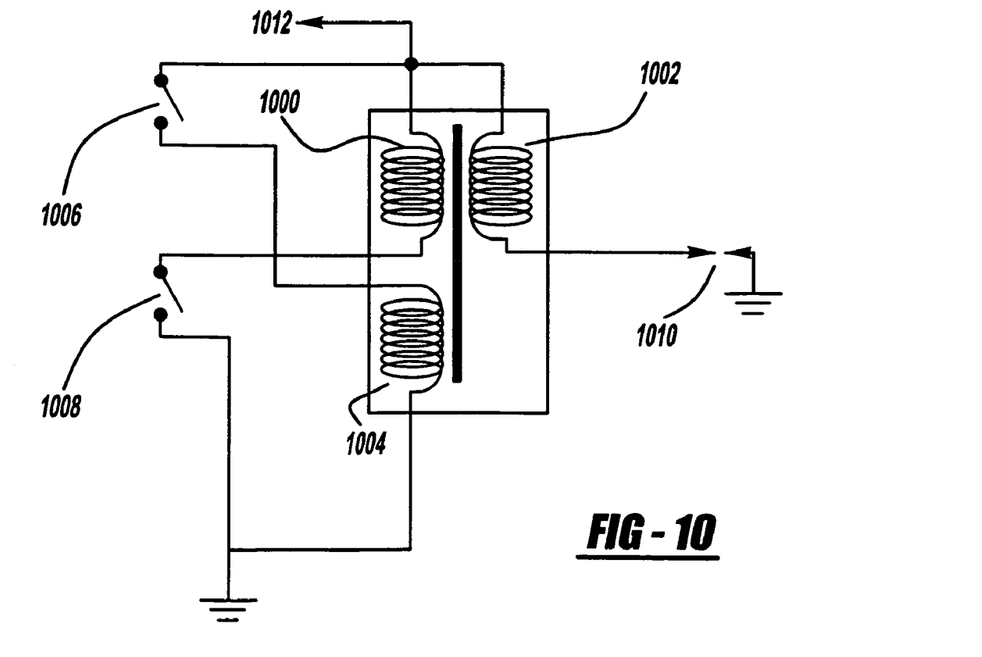
FIG. 10 is an example diagram that shows a auxiliary coil high side drive configuration with reduced wires count for a magnetic flux based voltage limiting circuit.

Referring to FIG. 10, a schematic of an alternate ignition coil having a primary coil 1000, secondary coil 1002, core, and an auxiliary coil 1004 is shown. A low voltage supply 1012 is connected to one side of the primary coil while the opposite side of the primary coil can be connected to the low voltage return through switch 1008. Secondary coil 1002 has one side connected to low voltage supply 1012 while the opposite coil side is connected to a spark plug. One side of auxiliary coil 1004 is connected to low voltage return while the opposite side can be connected to low voltage supply 1012, via switch 1006.

Operation of the circuit shown is FIG. 10 is similar to circuit operation detailed in the description of FIG. 7. Switch 1006 can be controlled to allow current flow into auxiliary coil 1004, thereby supporting the magnetic flux generated by the primary coil 1000. The location of the auxiliary coil switching switch may be preferred when as shown in FIG. 7, or alternatively, as shown in FIG. 10.

Figure 11:
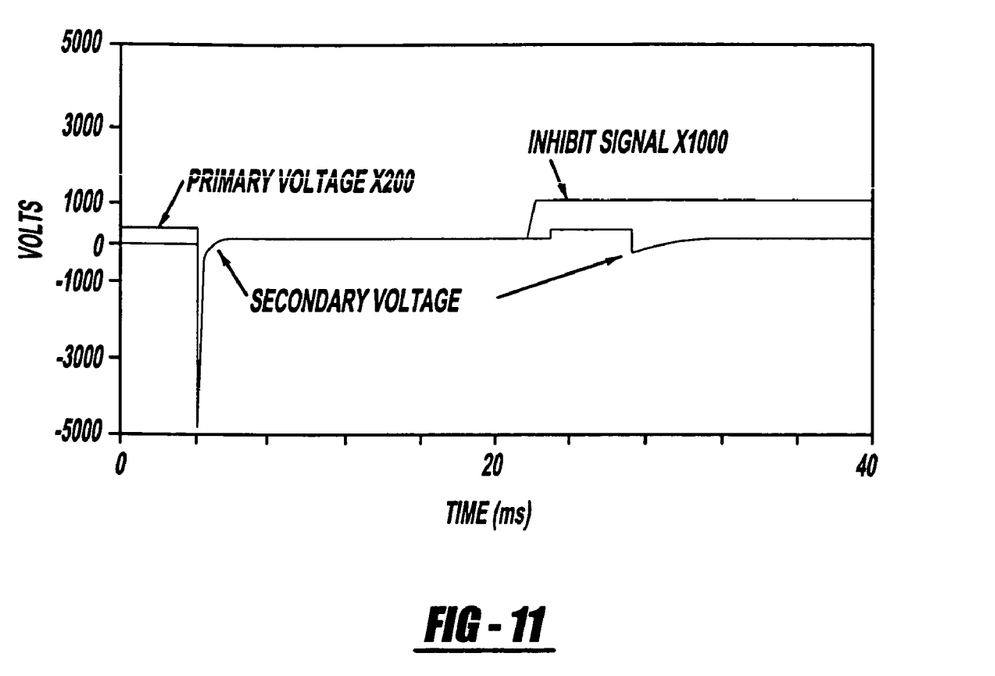
FIG. 11 is a plot of a simulated spark interrupt event.

Referring to FIG. 11, a plot of simulated ignition coil voltage limitation is shown. In particular, energy flow to the primary coil is reduced by yet another voltage limiting arrangement, where a resistor is switched into the primary coil circuit, such that it is connected in parallel to the primary coil. In the figure, current is interrupted to the primary coil at approximately 4 ms and 28 ms. When the spark inhibit signal is low (before 20 ms), interrupting current flow to the primary coil can cause an increase in the secondary coil voltage that may result in a spark at the spark plug. When the spark inhibit signal is high (after 20 ms), the secondary voltage is limited to less than a few hundred volts, reducing the possibility of spark at the spark plug.

As will be appreciated by one of ordinary skill in the art, the routines described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, or alternative fuel configurations could use the present description to advantage.

The invention claimed is:

1. A method of interrupting at least a spark event to at least a cylinder of a multi-cylinder internal combustion engine having at least a valve that may be held in a position during a cycle of said at least a cylinder, the method comprising:
   extracting energy from an ignition coil to reduce the possibility of a spark at a spark plug that is coupled to said ignition coil, said energy extracted when said at least a valve has at least partially degraded.

2. The method of claim 1 wherein said ignition coil has a primary winding, a secondary winding, and a core.

3. The method of claim 2 wherein said energy is extracted from said primary winding.

4. The method of claim 1 wherein said valve that may be held in a position is an electrically actuated valve.

5. The method of claim 4 wherein said electrically actuated valve is an electromechanical valve.

6. The method of claim 2 wherein said extracting energy is achieved by controlling the current flowing from said ignition coil.

7. The method of claim 2 wherein said extracting energy from said ignition coil is accomplished by reducing the magnetic energy of said core that is inducing a voltage in said secondary winding after said indication of valve degradation.

8. The method of claim 1 wherein said valve that may be held in a position is a cam actuated mechanical valve that may be selectively activated in an open and/or closed position.

9. The method of claim 1 wherein at least one intake valve of said at least a cylinder is held at least partially open for at least a portion of a piston stroke that is moving in a direction toward the head of said at least a cylinder.

10. A method of interrupting at least a spark event to at least a cylinder of a multi-cylinder internal combustion engine having at least a valve that may be held in a position during a cycle of said at least a cylinder, the method comprising:
    coupling an electrical network to an ignition coil after a request to inhibit spark in said at least a cylinder of said internal combustion engine, said coupling occurring when said at least a valve is at least partially degraded; and
    limiting the voltage of said ignition coil by said electrical network.

11. The method of claim 10 wherein said ignition coil has a core, primary winding, and a secondary winding.

12. The method of claim 11 wherein said electrical network is electrically coupled to said primary winding.

13. The method of claim 11 wherein said electrical network is magnetically coupled to said core.

14. The method of claim 12 wherein said electrical network is a series circuit comprising a switching device and a voltage breakdown device.

15. The method of claim 14 wherein said switching device is a transistor and wherein said voltage breakdown device is a zener diode.

16. The method of claim 13 wherein said electrical network is a series circuit comprising a switching device and a winding that may be magnetically coupled to said core.

17. The method of claim 10 wherein said indication of degradation is determined from at least a sensor monitoring said valve that may be held in position.

18. The method of claim 10 wherein said indication of degradation is determined from an inference made from at least a sensor that indicates an engine operating condition.

19. A system for interrupting at least a spark event to at least a cylinder of a multi-cylinder internal combustion engine having at least a valve that may be held in a position during a cycle of said at least a cylinder, the system comprising:
    an ignition coil comprising a core, a primary winding, a secondary winding, and an auxiliary winding;
    a switching device to allow current flow in said auxiliary winding; and
    a controller to operate said switching device during a condition of valve degradation such that a spark event is interruptible.

20. The system of claim 19 wherein said auxiliary coil may be electrically coupled to said primary coil.

21. The system of claim 19 wherein said switching device is a transistor.

22. A system for interrupting at least a spark event to at least a cylinder of a multi-cylinder internal combustion engine having at least a valve that may be held in a position during a cycle of said at least a cylinder, the system comprising;
    a means for indicating degradation of said valve that may be held in a position;
    an ignition coil comprising a core, a primary winding, a secondary winding; and
    an electrical network for extracting energy from said primary winding and reducing the possibility of a spark at a spark plug coupled to said ignition coil.

23. The system of claim 22 wherein said electrical network is a series circuit comprising a switching device and impedance.

24. The system of claim 22 wherein said electrical network is a series circuit comprising a switching device and voltage breakdown device.

25. The system of claim 24 wherein said voltage breakdown device is a zener diode and wherein said switching device is a transistor.

26. A computer readable storage medium having stored data representing instructions executable by a computer to control an internal combustion engine of a vehicle, said storage medium comprising:
    instructions for determining degradation of said valve that may be held in a position; and
    instructions for extracting energy from an ignition coil and reducing the possibility of a spark at a spark plug that is coupled to said ignition coil, said energy extracted when said at least a valve has at least partially degraded.

27. A method of interrupting at least a spark event to at least a cylinder of a multi-cylinder internal combustion engine having at least a valve that may be held in a position during a cycle of said at least a cylinder, the method comprising:
    limiting the voltage of an ignition coil after beginning to charge said ignition coil, and limiting said voltage while reducing the possibility of producing a spark at a spark plug coupled to said ignition coil when said at least a valve has at least partially degraded.

* * * * *